S. D. BUTTERWORTH.
FOLDING SEAT FOR AUTOMOBILES.
APPLICATION FILED SEPT. 25, 1911.
1,049,338.
Patented Jan. 7, 1913.
2 SHEETS—SHEET 2.
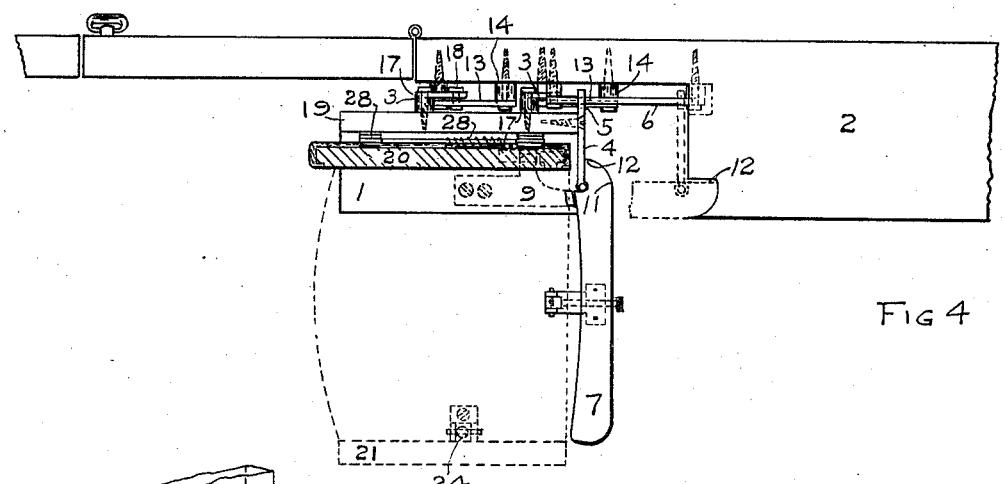
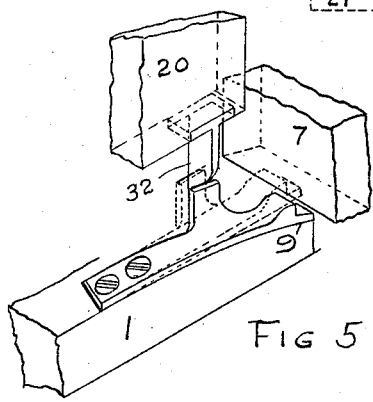
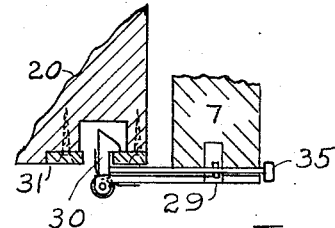
WITNESSES:
INVENTOR.
ATTORNEY.

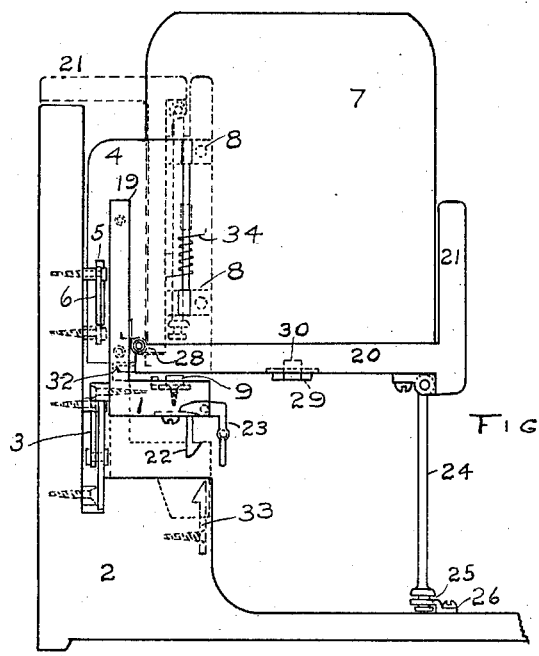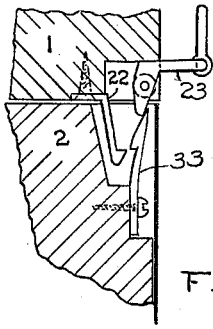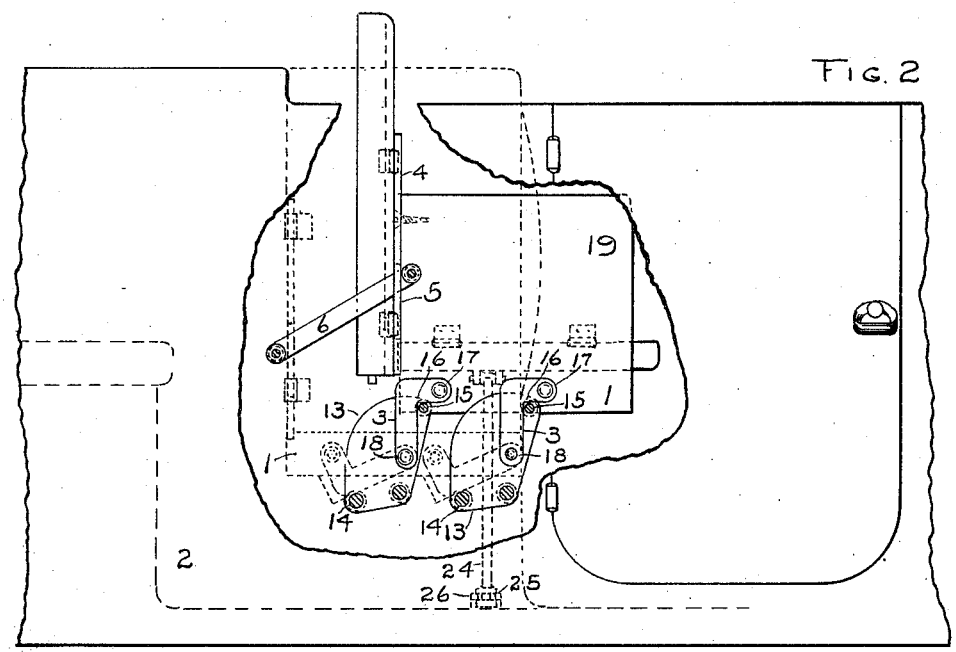

UNITED STATES PATENT OFFICE.

SAMUEL D. BUTTERWORTH, OF LANSING, MICHIGAN.

FOLDING SEAT FOR AUTOMOBILES.

1,049,338.  Specification of Letters Patent.  Patented Jan. 7, 1913.

Application filed September 25, 1911. Serial No. 651,262.

*To all whom it may concern:*

Be it known that I, SAMUEL D. BUTTERWORTH, a citizen of the United States, residing at Lansing, in the county of Ingham and State of Michigan, have invented certain new and useful Improvements in Folding Seats for Automobiles, of which the following is a specification.

My invention relates to folding seats and more especially to that type of such seats which is used in automobiles and is designed when not in use to be folded up and become as inconspicuous as possible, while furnishing a comfortable seat when desired.

The purpose of my invention is to make a seat that shall furnish ample room both in front and behind it when in position for use, without unduly increasing the length of the automobile body; that shall be absolutely rigid and secure in all its different positions, and that shall, when closed, merge itself as completely as possible with the upholstering of the automobile, and be out of the way of the side doors. I attain these purposes by the means shown in the accompanying drawings in which—

Figure 1 is an elevation of my device in its unfolded condition when ready for use, the folded position being indicated by dotted lines the view being taken from the front. Fig. 2 is an elevation taken from outside the automobile, the side of the automobile body being removed to show the operating mechanism, and the folded position being indicated by dotted lines. Figs. 3 to 6 are details to show more clearly various features of the construction.

In the drawings, 1 is the base or main support of my device which is pivotally attached to the main body 2 of the automobile by L shaped links 3. One extremity of each of these links is connected to the automobile body and the other to the base 1, so that as the base moves forward and upward, the base, and the seat it supports will always remain level. A metallic support 4 extends upward from the base and is provided near its outer edge with a slot 5 which is adapted to receive a guide or brace 6, which thus serves to maintain the back of the seat in an upright position. The back 7 of the seat is hinged to the support 4 by spring hinges 8 which are adapted to automatically close or fold the back of the seat when released. The back 7 is also provided with a seat support 29 securely attached to the lower edge. When the seat 20 is drawn down into its position for use, its rear edge engages with the support 29, which thus operates as a stop or support for the seat. The support 29 is provided, at its outer extremity, with a spring latch 30, engaging with a plate 31 on the lower side of the seat 20, which thus serves to hold the seat in position for use. The latch 30 is released by a push pin 32. Under any ordinary circumstances, no other support is necessary for the seat 20 than the base 1 and the support 29; but if desired, a leg 24 may be hinged to the bottom of the seat and provided with a groove 25 to engage with a leg fastening device 26, secured to the bottom of the automobile. In this case, the support 29 and the latch 30 might be entirely dispensed with. A spring lock 9 is attached to the base 1 in such a manner that when in its raised position, it will engage with the lower end of the back 7 when unfolded into position for use, and prevent it from closing. When, however, the seat 20 is folded up, so as to stand vertically, as shown by the dotted lines in Figs. 1 and 5, the lock 9 is kept pressed downward by engaging with the projection 32, having its extremity formed in the shape of an arc or inclined plane. The operation of this part of the device will be better described in connection with the operation of the device as a whole. The back side of the back 7 is extended in the form of a quadrantal segment 11 which is covered on its outer side with material to match the upholstering, so that when the back is folded, it merges with the upholstering as shown in Fig. 4 and when open in position for use, its inner edge 12 abuts against the support 4, thus assisting the lock 9 in maintaining the back of the seat in proper position and giving it additional stiffness. The links 3 move in guides 13 which are preferably made in the form of segments of a circle, and are arranged in pairs as shown in Fig. 2, each link moving between two of these guides. These guides 13 are made to such an arc of the circle that the lower fastening 14, by which the guides are attached to the automobile body, will serve as a rest or stop for the links 3 when the seat is folded back to its position when not in use, and the upper fastening 15 will, when the seat is brought forward for use, rest in the angle 16 of its corresponding link 3 and thus serve in connection with the guide 6 to rigidly support the base 1. It will also be noted that the lower fastening 14 is so placed with regard to the pivotal connection 17, the pivot 18 at the opposite extremity of the link 3 and the upper fastening 15, that when the seat is moved forward to working position the inner portion of the links 3 will stand a little forward of the vertical, and also of the stop 15, so that the weight of the seat will retain it in position, while only a very slight push will be necessary to throw it back. The lower fastening 14 is just low enough to permit a sufficient rearward and downward motion of the seat.

While I find it advisable to use L shaped links as shown, it is evident that straight links might be employed if desired, or various other arrangements of the connecting means might be used, without departing from my invention. I find it, however, important and much preferable to construct and attach the links 3 in such a manner that the base 1 will, at all times, be horizontal, that is parallel, to the bottom of the automobile. The base 1 is also provided with an upwardly extending arm 19 which serves as one side arm of the seat, and, when not in use, as a stop for the seat 20 when raised to its folded position. The arm 19 is placed inward far enough from the side of the automobile to leave room behind it for the working parts, and when the seat 20 is folded up to rest against the arm 19 it also is entirely free from the side of the automobile as shown in Fig. 2, and by the dotted lines in Fig. 1. This prevents any friction from this source and any consequent rubbing and chafing of the upholstering and pockets and other devices which are common on the sides of the bodies of automobiles.

The seat 20 is connected to the base 1, or the arm 19 as may be desired, by spring hinges 28, so that when released it will be thrown automatically upward into a vertical position resting as already stated against the arm 19, as shown in Figs. 4 and 1, the upholstering, however, being removed to better show the construction. It is provided at its outer edge with an arm 21 and is made of such width that when it is raised to a vertical position and the seat is folded up and thrown back, the arm 21 will be at a level with the upper edge of the upholstering on the body of the automobile and will form an extension to the regular upholstering of the body. This position is shown by the dotted lines in Fig. 1, the upholstering, however, being removed from the body of the automobile for purposes of clearness. The base is also provided with a lock 22 which engages with a latch 33 on the body of the automobile, and when in engagement locks the base in the lowered or folded position. This latch may be released in any desired manner, as by the movable lever 23, as shown in Fig. 3. I have shown this locking device attached to the front side of the base, as is most desirable with the particular style of automobile bodies indicated in the drawing; but it is evident that not only might this lock be attached to any desired point on the base which would be most convenient for the purpose, but it might be wholly dispensed with, without departing from my invention. If desired, a similar lock might also be provided to secure the device in its raised position, that is when brought forward for use, but, as this would differ in no way except position, from the one shown, it is omitted for the sake of clearness.

The form in which I have shown the base 1 is only one of many that might be employed; it might be composed either of wood or metal or a combination of the two or it might be considerably modified in many of the details of its construction, without departing from my invention.

The operation of my device is as follows: As already indicated, when the seat is folded, as shown by the dotted lines in Figs. 1 and 2, the upholstering on the body of the automobile harmonizes with, and apparently joins to the upholstering on the bottom of the seat 20 and on the outer part of the arm 21 so that the seat when folded up appears like an extension of the body of the automobile. When it is desired to use it, however, the latch 33 is released from the lock 22 by the lever 23 and the entire body of the device is moved upward and forward into the position shown by the solid lines in Figs. 1 and 2, the links 3 serving as a parallel to maintain the seat 20 and the base 1 level. The back 7 is then opened, turning on the hinges 8 and the seat 20 is drawn down to a horizontal position. This moves the projection 32 toward the rear and permits the latch 9 to rise into the position shown by the dotted lines in Fig. 5. The edge of the back 7 will then rest in the notch of the latch 9 and it will be prevented from folding up until released by the rising of the seat 20. At the same time the bottom of the seat 20 will rest upon and engage with, the support 29, and the latch 30 will engage with the plate 31 and hold the seat down so as to keep the seat and back in proper relative position in regard to each other, and also support the seat. If the leg 24 is used it will drop down of itself and the groove 25 can be placed in engagement with the fastening 26 thus serving to hold the seat down against the spring hinge 28, and also to support the seat; but, as already stated, this is needless unless the latch 30 is not used. When it is no longer desired to use the seat it is only necessary to release the leg 24 from the fastening 26, or the latch 30 from the plate 31, when the seat will at once be raised into an upright position by the spring hinges 28. This will release the spring latch 9 and the back will be closed against the underside of the seat by the spring 24. The leg 24, if used, will fall by its own weight against the underside of the seat and between the seat and the back. The entire seat can then be pushed backward and downward into its closed position, and will be locked there by the latch 23. It will be readily seen that by this forward motion of the entire body of the seat, room is made behind it so as to permit its use without inconveniencing those occupying the rear seats. When not in use it is thrown backward so as to be entirely out of the way of the entrance doors of the automobile. This makes it possible to attach and use my device on either or both sides of the vehicle without interfering with the entrance doors and without increasing the length of the automobile body, as would be necessary if the seat was not capable of a forward and backward motion, since in that case it would be necessary to make the automobile body from the doors back, long enough to permit room for those sitting behind the auxiliary seat, and also for the seat itself, without intruding upon the space necessary for the doors.

I claim as my invention and desire to secure by Letters Patent:

1. The combination with an automobile body, a longitudinally disposed relatively narrow supporting member positioned in close proximity to one side thereof, links positioned in close proximity to one side of the automobile body and pivotally secured at their upper ends to said supporting member and at their lower ends to fixed portions of said body, a seat carried by said supporting member, and a back carried by said supporting member, said seat and back being foldable to positions alongside of the side of said body and within the planes of the sides of said supporting member.

2. The combination with an automobile body, a longitudinally disposed relatively narrow supporting member positioned in close proximity to one side thereof, links positioned in close proximity to one side of the automobile body and pivotally secured at their upper ends to said supporting member, and at their lower ends to fixed portions of said body, a seat hinged to said supporting member so as to assume either a horizontal or a vertical position, and a back hinged to said supporting member and movable to a position to fold against the seat when the same is in folded position, said seat and back being arranged to lie within the planes of the sides of said supporting member when in their folded position.

3. The combination with an automobile body, a supporting member positioned in close proximity to one side thereof, links pivotally secured at their upper ends to said supporting member and at their lower ends to fixed portions of said body, stops coöperating with said links for holding said supporting member in its elevated position, a lock for holding said supporting member in its lowered position, a seat hinged to said supporting member so as to assume either a horizontal or a vertical position, and a back hinged to said supporting member and movable to a position to fold against the seat when the same is in folded position.

4. In a seat of the character described, a supporting member, said supporting member comprising a base portion, a wall extending upwardly from one edge thereof, and a transversely disposed plate extending upwardly from one end thereof, a seat hinged to the wall extending upwardly from one edge of the base member, a back hinged to the forward edge of the transversely disposed plate extending upwardly from the base whereby said back may be folded to overlie the seat when the same is folded, springs normally tending to move said seat and back to their folded positions, and means for locking said seat and back in their open positions.

5. In a seat of the character described, a supporting member, a seat hinged to said supporting member so as to assume either a horizontal or a vertical position, a back hinged to said supporting member and movable to a position to lie alongside of the seat when the same is in folded position, a spring tending to shift said back to its folded position, a latch for holding said back in its open position, and means acting automatically when the seat is elevated for actuating said latch to release the back.

6. In a seat of the character described, a supporting member, a seat hinged to said supporting member so as to assume either a horizontal or a vertical position, a back hinged to said supporting member and movable to a position to lie alongside of the seat when the same is in folded position, a latch for holding said back in its open position, means acting automatically when the seat is elevated for actuating said latch to release the back, a spring normally tending to shift said seat to its folded position, and means for holding said seat in its open position.

In testimony whereof I affix my signature in the presence of two witnesses.

SAMUEL D. BUTTERWORTH.

Witnesses:
H. L. LAWRENCE,
MARION NOXON.